Patented Jan. 31, 1939

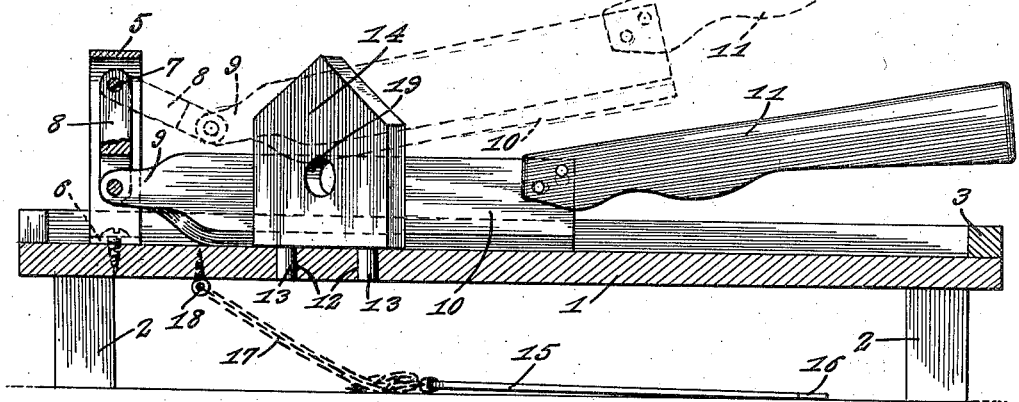
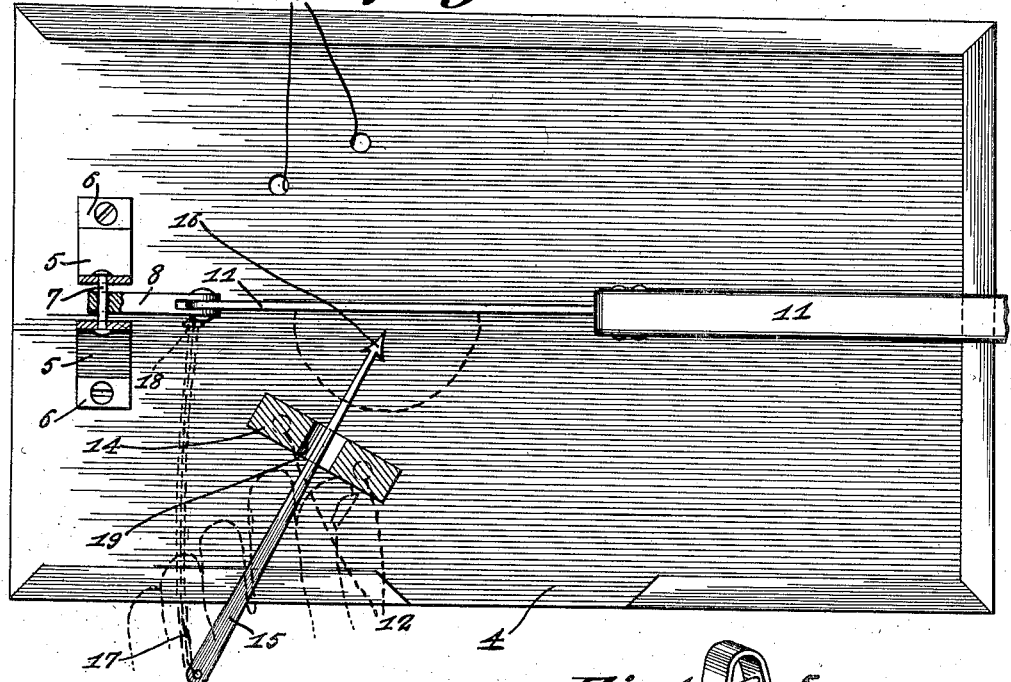
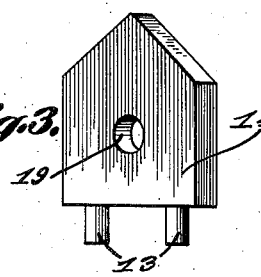

2,145,470

UNITED STATES PATENT OFFICE 2,145,470

VEGETABLE CUTTER

William Baham, Baton Rouge, La.

Application July 27, 1937, Serial No. 155,995

1 Claim. (Cl. 146—215)

This invention relates to cutting and slicing devices, and its general object is to provide a device of that character which is primarily designed for use for slicing, cutting and mincing vegetables, fruits and the like, with minimum effort on the part of the user, in that such can be done with my device in an easy and expeditious manner, and without fear of cutting or injuring the fingers or hands, as they are not only protected from coming in contact with the blade, but the device includes a holder for the material being cut, for use in feeding the material to the blade.

A further object is to provide a cutting device that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a longitudinal sectional view taken through the slicer which forms the subject matter of the present invention, and illustrates parts in elevation and in dotted lines.

Figure 2 is a top plan view of the slicer, and illustrates the same in use.

Figure 3 is a detail perspective view of the protecting block or shield.

Figure 4 is a detail perspective view of the knife mounting bracket.

Referring to the drawing in detail, the reference numeral 1 indicates a base providing a cutting board which is elevated and supported by legged members 2 secured to the underside thereof adjacent the ends, the board being of rectangular configuration in the form as shown, and has moulding strips secured to and rising from about the outer edges thereof, as best shown in Figure 2, in order to retain the cut material thereon, as will be apparent. However, a passageway 4 is provided between two of the strips, to allow the material to be scraped from the board, as well as to facilitate cleaning the latter.

Secured to and rising from adjacent one end of the board and centrally of the sides thereof is an inverted substantially V-shaped bracket 5 that includes apertured ears 6 for the purpose of receiving suitable means, such as screws for fixing the bracket to the board, as best shown in Figure 2. Bridging the bracket adjacent the apex end thereof and secured in its arms is a pin 7, to which is journaled one of the ends of a link 8, while the opposite end thereof is bifurcated and has pivotally mounted between the bifurcated portions thereof the outer reduced end 9 of the blade 10 of the knife of my slicer, the blade having a beveled lower edge and has secured to the upper corner of the opposite end thereof a handle 11, which preferably has its underside shaped in corrugated formation for a portion of its length to provide a convenient and firm gripping means, as will be apparent upon inspection of Figure 1.

The board is provided with pairs of openings 12 arranged upon opposite sides of the knife, as best shown in Figure 2 and these openings are for the purpose of receiving studs 13 that are secured to and depend from the underside of a relatively flat protecting block or shield 14, for the hands of the user, as shown in Figure 2, it being obvious that the block can be disposed upon either side of the blade, for use for either a right hand or left hand person, and is arranged in the drawing for a right hand person.

I also employ a holder for the material being cut or sliced, and the holder in the form as shown is in the form of a spear that includes a rod like handle portion 15 and a spear head 16, the handle portion being tapered outwardly from the head 16 and has an opening in the outer end thereof to which is secured one end of a flexible element 17, such as a chain and the opposite end of the element 17 is secured to a screw eye 18 that is fixed to the underside of the board, as clearly shown in Figure 1. The protecting block 14 is shown as being provided with inclined upper portions disposed in converging relation with respect to each other to provide a substantially triangular formation, and extending centrally through the block 14 is an opening 19 providing a passageway for the holder, as clearly shown in Figure 2.

From the above description and disclosure of the drawing, it will be obvious that I have provided a slicing device that is primarily designed for slicing, cutting and mincing vegetables, fruits and the like, and when it is desired to slice or cut a potato, apple, or similar fruit or vegetable, the holder is passed through the opening 19 and the fruit or vegetable is disposed thereon as shown in Figure 2, so that it can be held in the path of the blade, which is capable of being reciprocated for slicing and cutting, and when it is desired to cut or mince the sliced material, the blade can be both reciprocated and oscillated, due to the link connection between the blade and mounting bracket and the association of the link with respect to the bracket, as clearly shown in Figure 2, thus enabling the user to easily and expeditiously mince the sliced or cut material, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A cutting device comprising a cutting board, a knife fixed in operative position to the board for cutting material thereon, manual means for holding the material to be cut and including a rod like handle having a spear head thereon to penetrate the material, flexible means connecting the holding means to the board, an upstanding protecting block having an opening through the sides thereof for the passage of the holding means therethrough for cooperation with the latter to protect the fingers of the user, and said block being removably mounted on the board for disposal on either side of the knife.

WILLIAM BAHAM.